United States Patent [19]
Kawamura

[11] Patent Number: 5,760,973
[45] Date of Patent: Jun. 2, 1998

[54] COMPACT WIDE-ANGLE LENS SYSTEM

[75] Inventor: Atsushi Kawamura, Yokosuka, Japan

[73] Assignee: Ricoh Company, Ltd., Tokyo, Japan

[21] Appl. No.: 771,305

[22] Filed: Dec. 20, 1996

[30] Foreign Application Priority Data

Dec. 26, 1995 [JP] Japan .................................. 7-338654

[51] Int. Cl.⁶ .......................... G02B 13/04; G02B 9/58
[52] U.S. Cl. ................................... 359/753; 359/782
[58] Field of Search ............................. 359/782, 753, 359/752, 751, 750, 749

[56] References Cited

U.S. PATENT DOCUMENTS

| | | | |
|---|---|---|---|
| 3,352,620 | 11/1967 | Scidmore et al. | 359/753 |
| 3,376,091 | 4/1968 | Wagner et al. | 359/782 |
| 3,517,986 | 6/1970 | Schlegel | 359/782 |
| 4,576,444 | 3/1986 | Kawamura | 359/693 |
| 4,653,873 | 3/1987 | Kawamura | 359/686 |
| 4,673,259 | 6/1987 | Kawamura | 359/753 |

FOREIGN PATENT DOCUMENTS

| | | |
|---|---|---|
| 5-134175 | 5/1993 | Japan . |
| 5-173062 | 7/1993 | Japan . |

Primary Examiner—Scott J. Sugarman
Attorney, Agent, or Firm—Oblon, Spivak, McClelland, Maier & Neustadt, P.C.

[57] ABSTRACT

A wide-angle lens system includes a first, second, third and fourth lens components which are arranged in this order in a direction from an object side to an image surface side along an optical axis. A stop is provided between the second lens component and the third lens component. The first lens component comprises a double-concave lens, the first lens component having a first refracting power $\phi 1$ which is negative. The second lens component comprises a positive lens and a negative lens which are arranged in this order in the direction, the second lens component having a second refracting power $\phi 2$ which is positive. The third lens component comprises a negative lens, a positive lens and a negative lens which are arranged in this order in the direction, the third lens component having a third refracting power $\phi 3$ which is positive. The fourth lens component comprises a negative lens, the fourth lens component having a fourth refracting power $\phi 4$ which is negative. In the lens system, the first refracting power, the second refracting power, the third refracting power, and the fourth refracting power satisfy the conditions: (1) $0.7 < \phi 1/\phi 4 < 2.5$; and (2) $1.8 < \phi 2/\phi 3 < 7.0$.

23 Claims, 9 Drawing Sheets

[EXAMPLE 2]

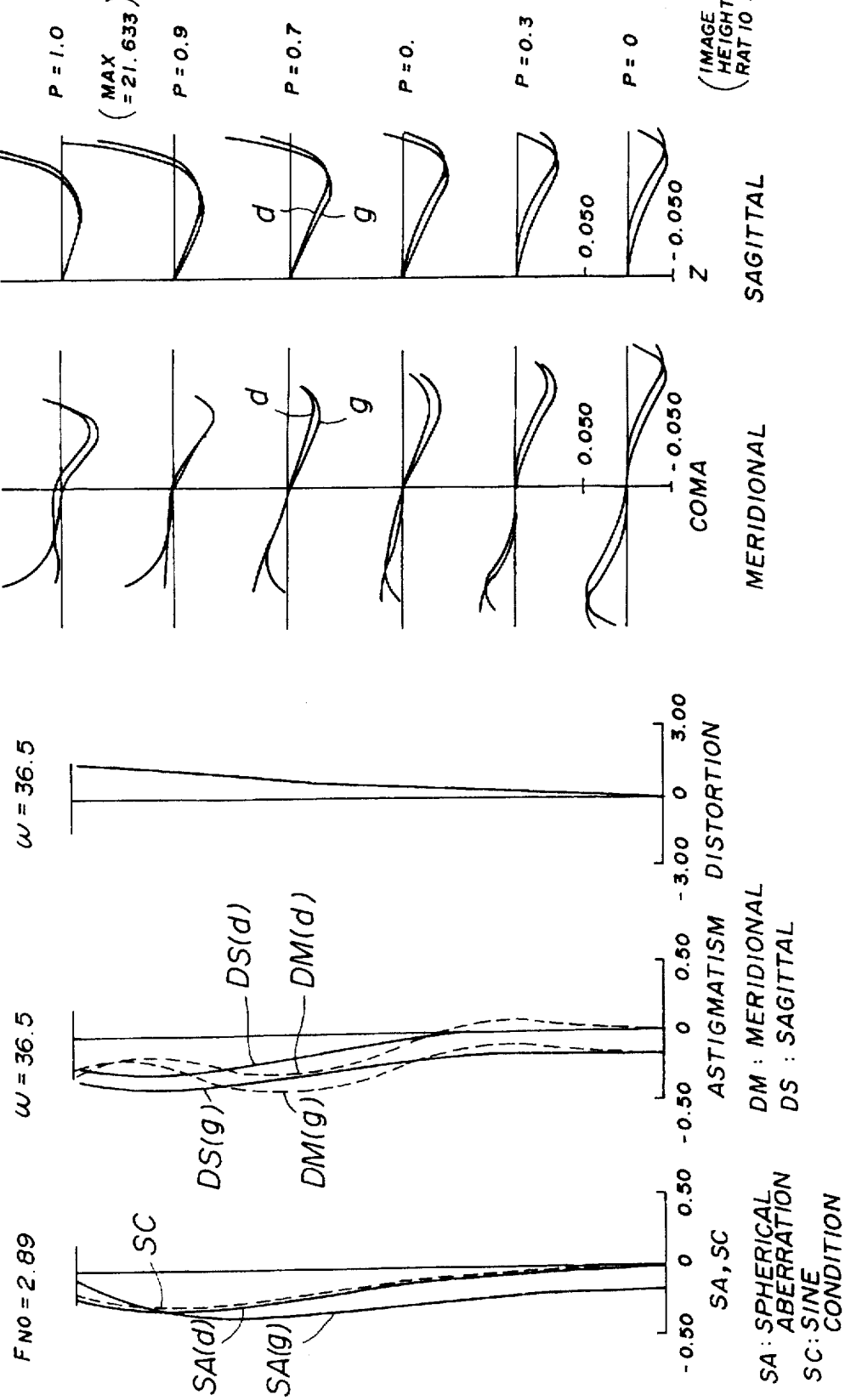
FIG. 7 [EXAMPLE 3]

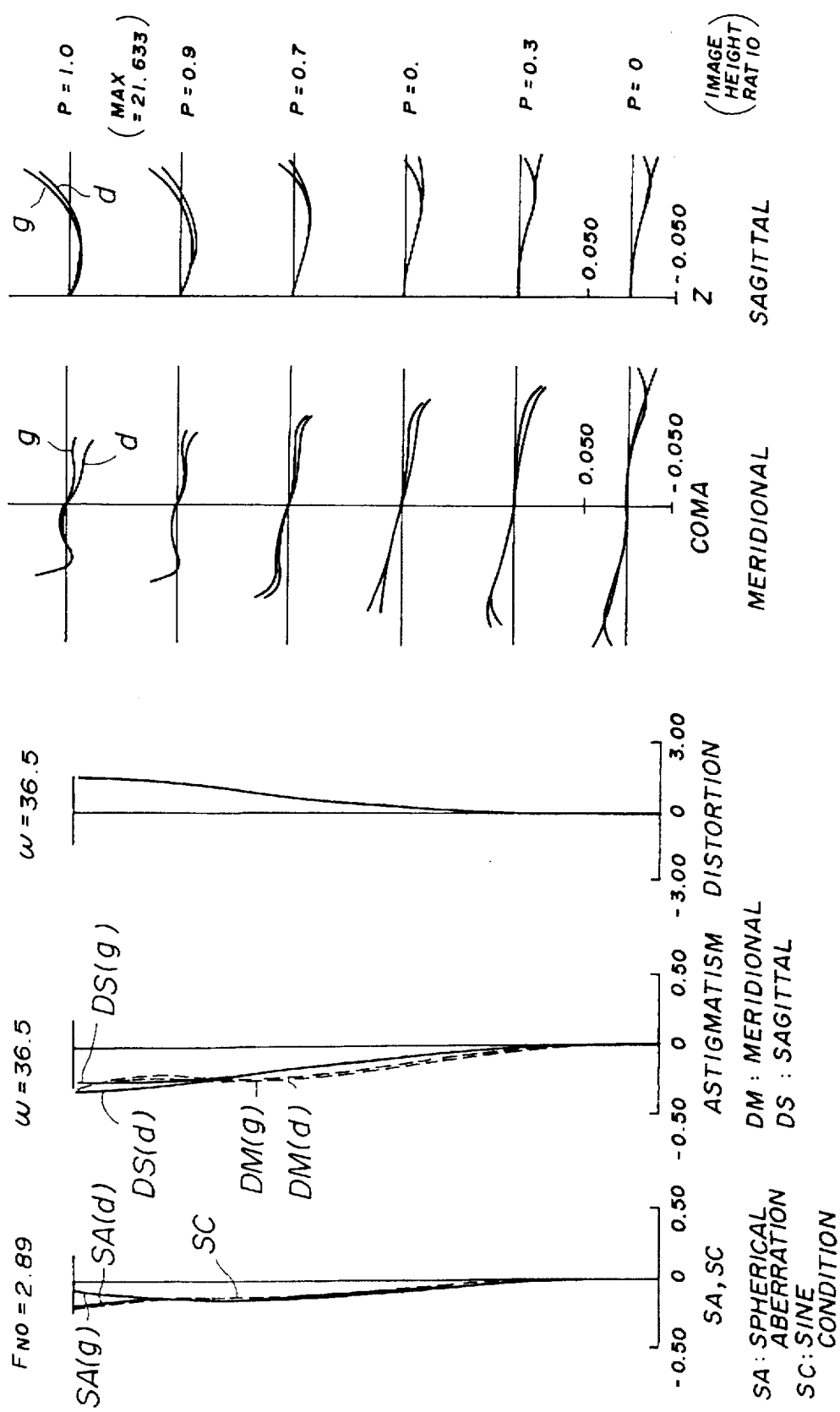
FIG. 8 [EXAMPLE 4]

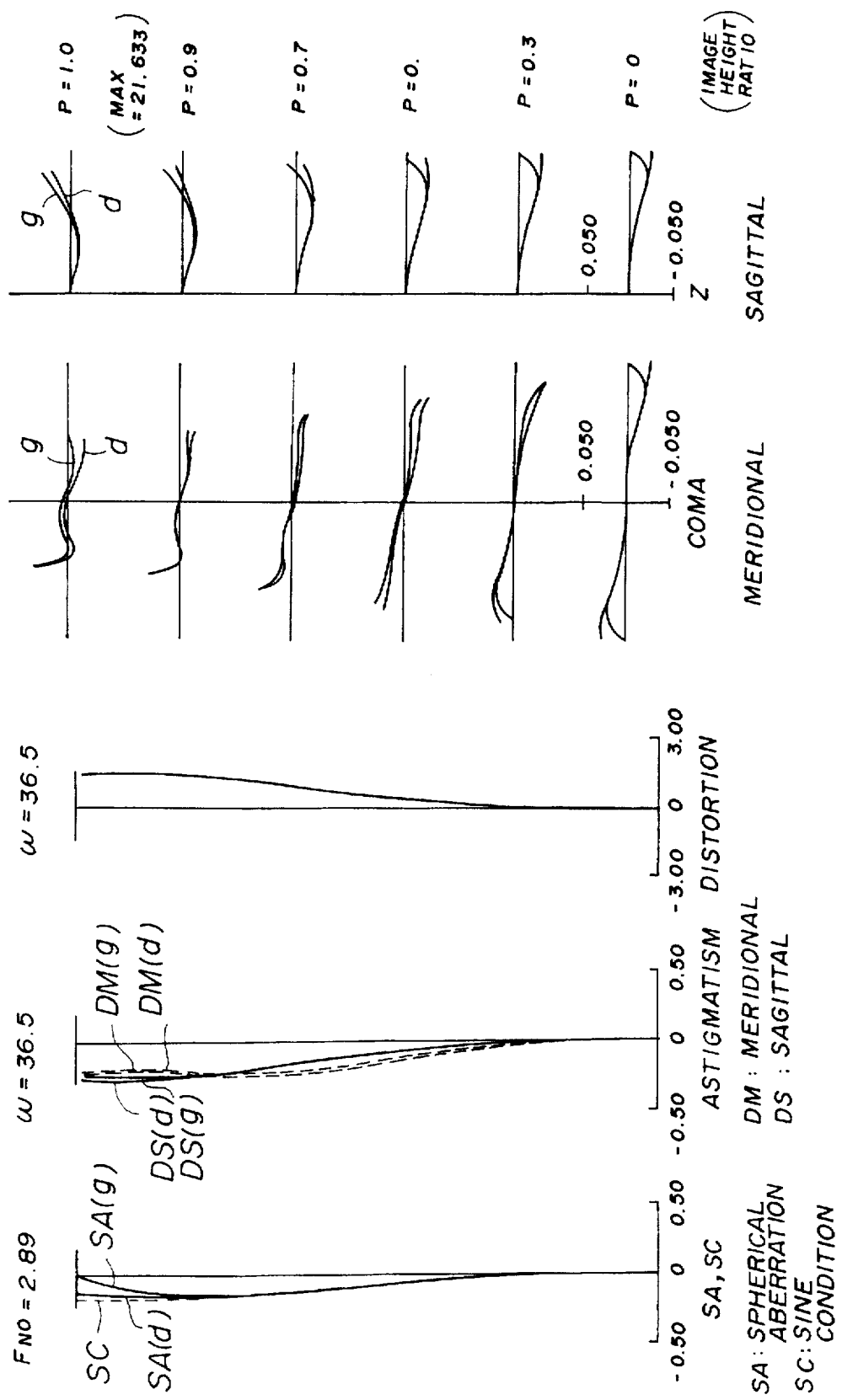
FIG. 9 [EXAMPLE 5]

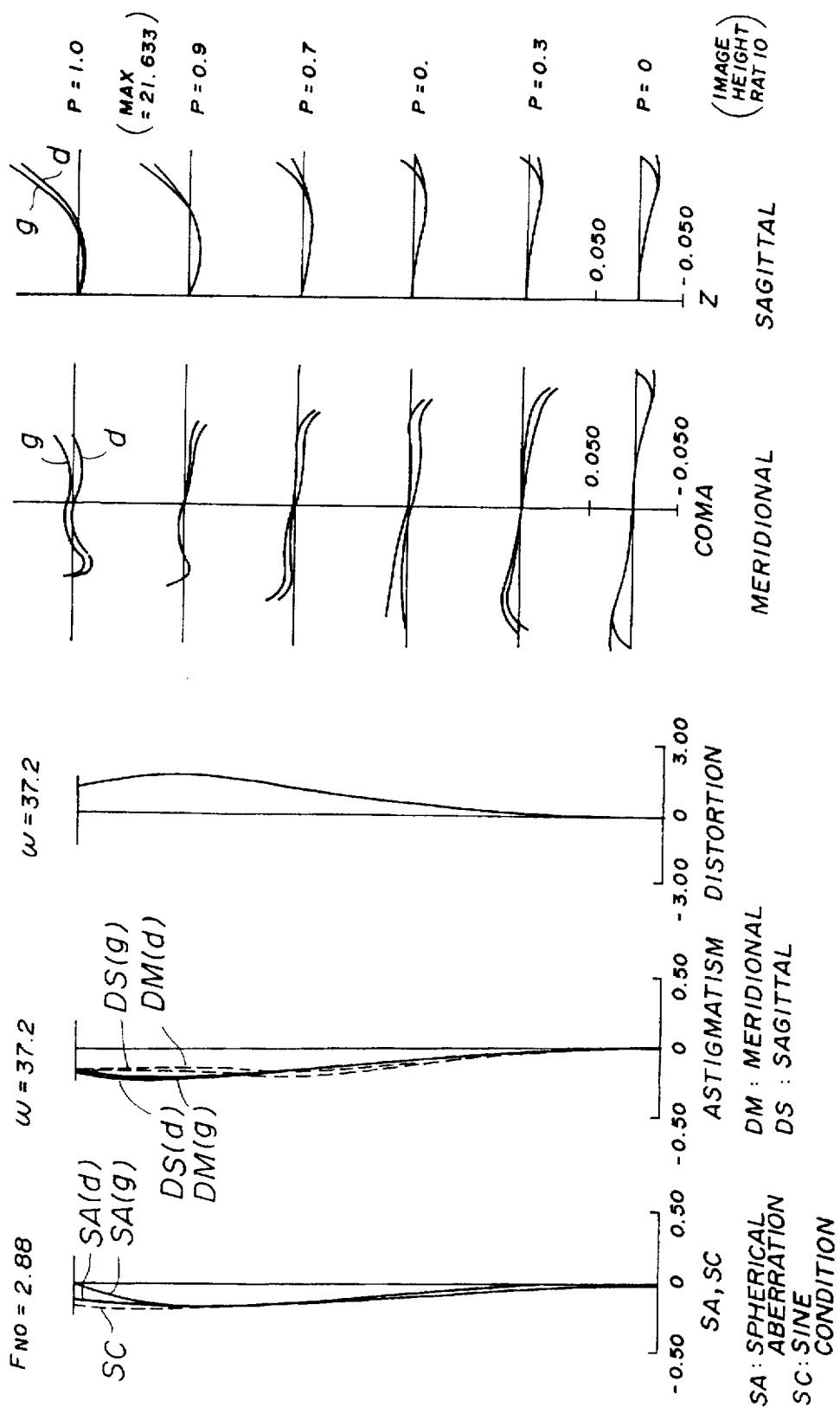

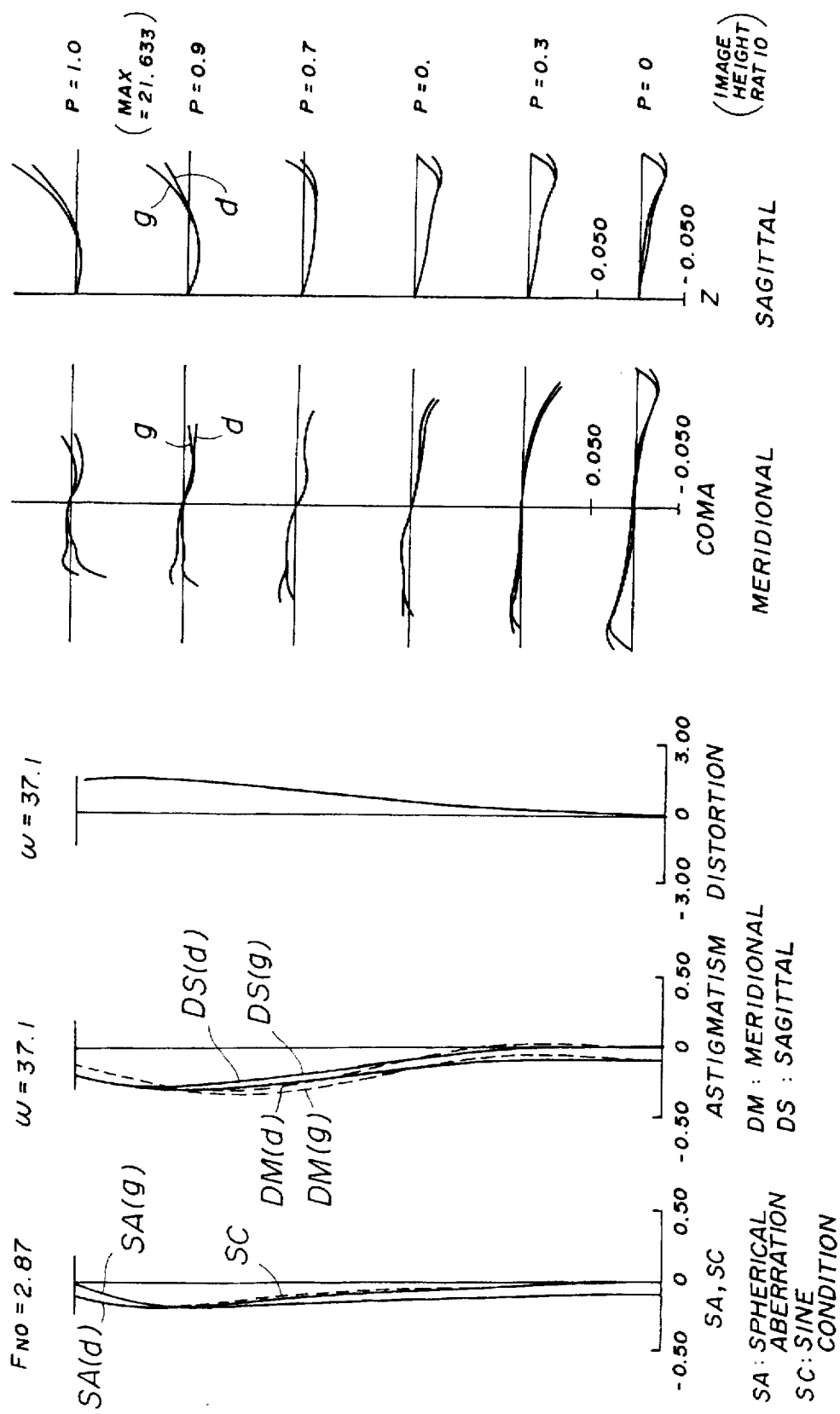

COMPACT WIDE-ANGLE LENS SYSTEM

BACKGROUND OF THE INVENTION

(1) Field of the Invention

The present invention relates to a compact wide-angle lens system which is suitably applicable to a photographic lens of a compact camera or a digital camera.

(2) Description of the Related Art

A lens-shutter camera which includes a lens-shutter unit and a lens-system retracting mechanism is known. The lens-system retracting mechanism is also called a retractable barrel mechanism. When the camera of this type operates, the retracting mechanism sets the lens system in an operating condition so that the lens system can operate. When the camera is not used, the retracting mechanism sets the lens system in a retracted condition so that the lens system is held inside the camera.

Therefore, when designing a lens system of a compact camera of the above type, it is desirable to make, as small as possible, the total thickness of the lens system, so that the lens system in the retracted condition is suitably accommodated in the compact camera.

From the point of view of practical use, major requirements for a lens system of a compact camera of the above type are: (1) the lens system must meet the specifications of the photographic lens of the camera, for example, F-number 2.8/focal length 28 mm, and at the same time it must provide a high performance to adequately correct the aberrations of the lens elements; (2) the lens system must provide a sufficient quantity of peripheral light rays without increasing the diameters of front and back lens elements in the lens system; and (3) a lens-system retracting mechanism having a simple structure can be used in the camera without increasing the back focal distance of the lens system.

Japanese Laid-Open Patent Application No. 5-134175 discloses a lens system which satisfies some of the above-described requirements. However, when the F2.8/28 mm specifications are taken into account, the ratio of the total thickness (D) of the lens system to the focal length (f) of the lens system disclosed in the above publication is in the range from 0.803 to 0.954. It is very difficult for this lens system to provide a reduced total thickness for the retracted condition and a good performance to adequately correct the aberrations of the lens elements.

SUMMARY OF THE INVENTION

An object of the present invention is to provide an improved wide-angle lens system in which the above-described problems are eliminated.

Another object of the present invention is to provide a compact, wide-angle lens system which has a reduced total thickness appropriate for a compact camera in which the lens system is set in the retracted condition, and has, at the same time, a good performance to adequately correct aberrations of the lens elements.

The above-mentioned objects of the present invention are achieved by a wide-angle lens system which comprises: a first, second, third and fourth lens components which are arranged in this order in a direction from an object side to an image surface side along an optical axis; and a stop provided between the second lens component and the third lens component, the first lens component comprising a double-concave lens, the first lens component having a first refracting power $\phi 1$ which is negative, the second lens component comprising a positive lens and a negative lens which are arranged in this order in the direction, the second lens component having a second refracting power $\phi 2$ which is positive, the third lens component comprising a negative lens, a positive lens and a negative lens which are arranged in this order in the direction, the third lens component having a third refracting power $\phi 3$ which is positive, the fourth lens component comprising a negative lens, the fourth lens component having a fourth refracting power $\phi 4$ which is negative, wherein the first refracting power, the second refracting power, the third refracting power, and the fourth refracting power satisfy the conditions: (1) $0.7<\phi 1/\phi 4<2.5$ and (2) $1.8<\phi 2/\phi 3<7.0$.

The above-mentioned objects of the present invention are achieved by a wide-angle lens system which comprises: a first lens element which is a double-concave lens having a first refracting power $\phi 1$ which is negative; a second lens element which is a positive lens; a third lens element which is a negative lens, the second and the third lens elements having a second refracting power $\phi 2$ which is positive; a fourth lens element which is a negative lens; a fifth lens element which is a positive lens; a sixth lens element which is a negative lens, the fourth, the fifth and the sixth lens elements having a third refracting power $\phi 3$ which is positive; a seventh lens element which is a negative lens having a fourth refracting power $\phi 4$ which is negative; and a stop provided between the third lens element and the fourth lens element, the first, the second, the third, the fourth, the fifth, the sixth and the seventh lens elements being arranged in this order in a direction from an object side to an image surface side along an optical axis, wherein the first refracting power, the second refracting power, the third refracting power, and the fourth refracting power satisfy the conditions: (1) $0.7<\phi 1/\phi 4<2.5$ and (2) $1.8<\phi 2/\phi 3<7.0$.

The above-mentioned objects of the present invention are achieved by a wide-angle lens system which comprises: a first lens component, a second lens component, a third lens component and a fourth lens component which are arranged in this order in a direction from an object side to an image surface side along an optical axis; and a stop provided between the second lens component and the third lens component, the first lens component comprising a double-concave lens, the first lens component having a first refracting power $\phi 1$ which is negative, the second lens component comprising a positive lens and a negative lens which are arranged in this order in the direction, the second lens component having a second refracting power $\phi 2$ which is positive, the third lens component comprising a negative lens, a positive lens and a negative lens which are arranged in this order in the direction, the third lens component having a third refracting power $\phi 3$ which is positive, the fourth lens component comprising a negative lens, the fourth lens component having a fourth refracting power $\phi 4$ which is negative, wherein I and J are integers and the J-th one of lenses in the I-th one of the first, the second, the third and the fourth lens components has a refractive index which is represented by N(I, J), and wherein a refractive index N(3, 2) of the positive lens in the third lens component, a refractive index N(3, 1) of the negative lens in the third lens component and a refractive index N(3, 3) of the negative lens in the third lens component satisfy the condition:

$$0.1<N(3, 2)-\{N(3, 1)+N(3, 3)\}/2.$$

It is possible for the wide-angle lens system of the present invention to have a reduced total thickness and a good performance to adequately correct the aberrations of the lens elements even though the F2.8/28 mm specifications are met. Since the compact wide-angle lens system of the present invention has a reduced total thickness, it can be suitably applied to a compact camera having a retracting mechanism which sets the lens system in the retracted condition. The wide-angle lens system of the present invention enables the retracting mechanism of the camera to be designed with a simple structure.

BRIEF DESCRIPTION OF THE DRAWINGS

Other objects, features and advantages of the present invention will become more apparent from the following detailed description when read in conjunction with the accompanying drawings in which:

FIGS. 5, 6 and 7 are diagrams showing aberrations of Examples 1, 2 and 3 of the compact wide-angle lens system in FIG. 1;

FIGS. 8 and 9 are diagrams showing aberrations of Examples 4 and 5 of the compact wide-angle lens system in FIG. 2; and FIGS. 10 and 11 are diagrams showing aberrations of Examples 6 and 7 of the compact wide-angle lens systems in FIGS. 3 and 4.

DETAILED DESCRIPTION OF THE PREFERRED EMBODIMENTS

A description will now be given of the preferred embodiments of the present invention with reference to the accompanying drawings.

Figure 1:
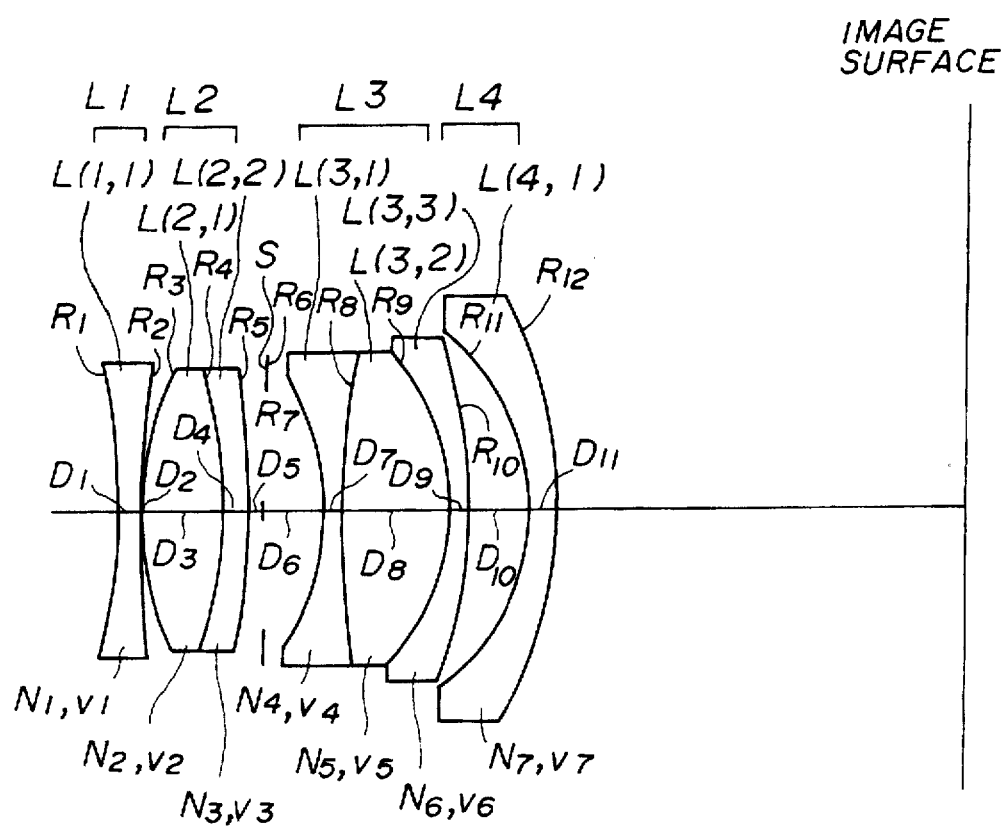
FIG. 1 is a diagram for explaining a construction of a compact wide-angle lens system in a first embodiment of the present invention.

FIG. 1 shows a construction of a compact wide-angle lens system in the first embodiment of the present invention.

As shown in FIG. 1, the compact wide-angle lens system in the present embodiment comprises a plurality of lens components including a first lens component L1, a second lens component L2, a third lens component L3 and a fourth lens component L4 which are arranged, in this order, in a direction from an object side (which is the left side of this drawing) to an image surface side (which is the right side of this drawing) along an optical axis.

The wide-angle lens system of the present embodiment comprises an aperture stop "S" provided between the second lens component L2 and the third lens component L3.

In the wide-angle lens system of the present embodiment, each of the lens components L1 through L4 includes one or a plurality of lens elements. To identify one of the lens elements in one of the lens components L1 through L4, the J-th one of the lens elements included in the I-th one of the lens components L1 through L4 is represented by L(I, J) where I and J are integers. The lens components and the lens elements included therein are counted from the object side in the direction.

The first lens component L1 includes a double-concave lens L(1, 1), and the first lens component L1 has a first refracting power $\phi 1$ which is negative.

The second lens component L2 includes a positive lens L(2, 1) and a negative lens L(2, 2) which are arranged in this order in the direction. The second lens component L2 as the whole has a second refracting power $\phi 2$ which is positive.

The third lens component L3 includes a negative lens L(3, 1), a positive lens L(3, 2) and a negative lens L(3, 3) which are arranged in this order in the direction. The third lens component L3 as the whole has a third refracting power $\phi 3$ which is positive.

The fourth lens component L4 includes a negative lens L(4, 1). The fourth lens component L4 has a fourth refracting power $\phi 4$ which is negative.

In the above-described lens system, the first refracting power $\phi 1$, the second refracting power $\phi 2$, the third refracting power $\phi 3$, and the fourth refracting power $\phi 4$ satisfy the conditions:

$$0.7 < \phi 1/\phi 4 < 2.5 \tag{1}$$

$$1.8 < \phi 2/\phi 3 < 7.0. \tag{2}$$

Generally, a lens having a refracting power which is smaller than zero, or negative, is called a negative lens, and a lens having a refracting power which is larger than zero, or positive, is called a positive lens. A refracting power of a lens component as a whole is a reciprocal to a focal length of the lens component.

The wide-angle lens system in which the above Conditions (1) and (2) are satisfied uses a symmetrical arrangement of the refracting powers of the lens components L1 through L4, that is, the refracting powers $\phi 1$, $\phi 2$, $\phi 3$ and $\phi 4$ are, in this order, negative, positive, positive and negative. The wide-angle lens system of the present embodiment provides a good performance to adequately correct the aberrations of the lens system. However, if the arrangement of the configuration of the lenses is symmetrical, it is difficult to provide a reduction of the ratio of the total width (D) of the lens system to the focal length (f) of the lens system.

In the wide-angle lens system in which the Conditions (1) and (2) are satisfied, the first lens component L1 includes the double-concave lens L(1, 1) which is not a negative meniscus lens, in order to provide a reduction of the total width of the lens system as well as a good performance to adequately correct the aberrations of the lens system.

The above Condition (1) defines a range of the ratio of the refracting power $\phi 1$ of the first lens component L1 to the refracting power $\phi 4$ of the fourth lens component L4, which is appropriate for a wide-angle lens system in which a reduction of the total thickness of the lens system and a high performance of the lens system are compatible with each other.

When the parameter $\phi 1/\phi 4$ of the Condition (1) is less than the lower limit (=0.7), the arrangement of the refracting powers will be asymmetrical, and it is difficult to adequately correct the curvature of field. Also, in such a case, the distortion will be too large, and it is difficult to correct the distortion.

When the parameter $\phi 1/\phi 4$ of the Condition (1) is larger than the upper limit (=2.5), the overall length of the wide-angle lens system from the first refraction surface to the image surface will not be reduced to a suitable length. Although the total thickness of the lens system in the retracted condition can be reduced, it is difficult to design the retracting mechanism for holding the lens system inside the camera by using a simple structure.

The above Condition (2) defines a range of the ratio of the refracting power $\phi 2$ of the second lens component L2 to the refracting power φ3 of the third lens component L3, which is appropriate for a wide-angle lens system in which a reduction of the total thickness of the lens system and a high performance of the lens system are compatible with each other.

When the parameter φ2/φ3 of the Condition (2) is less than the lower limit (=1.8), the back local distance of the lens system will be too large and it is difficult to adequately correct the aberrations of the lens system. When the parameter φ2/φ3 of the Condition (2) is larger than the upper limit (=7.0), the spherical aberrations will be too large, and it is difficult to adequately correct the spherical aberrations.

The wide-angle lens system having the construction shown in FIG. 1 has not only the above-described features but also the following features which are important to characterize the present invention.

In the wide-lens lens system (no matter whether the Conditions (1) and (2) are not satisfied), the J-th one of lenses in the I-th one of the first, the second, the third and the fourth lens components L1, L2, L3 and L4 has a refractive index which is represented by N(I, J) where I and J are integers, and a refractive index N(3, 2) of the positive lens L(3, 2), a refrective index N(3, 1) of the negative lens L(3, 1) and a refractive index N(3, 3) of the negative lens L(3, 3) satisfy the condition:

$$0.1 < N(3, 2) - \{N(3, 1) + N(3, 3)\}/2. \quad (1A)$$

In the above-mentioned lens system, the third lens component L3 as the whole has the third refracting power φ3 which is positive, although two negative lenses and one positive lens are included in the third lens component L3. If the third lens component L3 includes two negative lenses and one positive lens and the third refracting power φ3 is negative, such a wide-angle lens system is likely to produce the convergent-type aberrations excessively.

In the wide-angle lens system in which the Condition (1A) is satisfied, the refractive index N(3, 2) of the positive lens L(3, 2) is adequately greater than the average of the refrective index N(3, 1) of the negative lens L(3, 1) and the refractive index N(3, 3) of the negative lens L(3, 3). The refracting surfaces between the lens elements in the third lens component L3 can have convergent characteristics and suitably reduce the aberrations of the lens elements. It is possible for the above-mentioned lens system to provide a good performance to adequately correct the aberrations and prevent the lowering of the balance of the four lens components performance due to the aberrations.

When the parameter of the Condition (1A) is less than the limit (=0.1), the sum of Petzval's theorem will be too large and the curvature of field will be unsuitable. In such a case, it is difficult to provide a good performance to adequately correct the aberrations of the lens elements.

It is obvious that if the above Condition (1A) is satisfied in the wide-angle lens system in which the Conditions (1) and (2) are further satisfied, the wide-angle lens system provides a better performance to adequately correct the aberrations of the lens elements.

Further, referring to FIG. 1, in the wide-angle lens system in which the Conditions (1) and (2) are satisfied, the J-th lens L(I, J) in the I-th component has a refractive index N{L(I, J)} and an Abbe's number v{L(I, J)}. A refractive index N{L(2, 1)} of the positive lens L(2, 1) in the second lens component L2 and a refractive index N{L(3, 2)} of the positive lens L(3, 2) in the third lens component L3 satisfy the condition:

$$1.7 < [N\{L(2, 1)\} + N\{L(3, 2)\}]/2. \quad (3)$$

At the same time, in the wide-angle lens system in which the Conditions (1) and (2) are satisfied, an Abbe's number v{L(2, 1)} of the positive lens L(2, 1) and an Abbe's number v{L(2, 2)} of the negative lens L(2, 2) in the second lens component L2 satisfy the condition:

$$7 < v\{L(2, 1)\} - v\{L(2, 2)\}. \quad (4)$$

In FIG. 1, the refractive indexes N{L(2, 1)} and N{L(3, 2)} described above are indicated by "N2" and "N3", and the Abbe's numbers v{L(2, 1)} and v{L(2, 2)} described above are indicated by "v2" and "v3".

In the wide-angle lens system of the present invention, as shown in FIG. 1, the lens L(2, 1) and the lens L(3, 1) are two convex lenses among the seven lenses included in the whole lens system. It is desirable to prevent the aberrations of the two convex lenses in order to provide a better performance of the wide-angle lens system and prevent the lowering of the performance due to assembly errors.

When the parameter of the Condition (3) is less than the lower limit (=1.7), the sum of Petzval's theorem will be too large and the astigmatism and the curvature of field will be negative, and it is difficult to correct the astigmatism and the curvature of field.

When a junction lens is included in any of the second lens component L2 and the third lens component L3 and the parameter of the Condition (3) is less than the lower limit, the radius of curvature of a junction surface of the junction lens will be too large, and it is difficult to produce such a junction lens including a convex lens with a necessary edge thickness. Also, in such a case, it is difficult to provide a reduced total thickness of the lens system.

It is possible for the wide-angle lens system of the present embodiment to make the correction of axial chromatic aberration and the correction of magnification chromatic aberration convertible with each other by correcting the chromatic aberrations on both the object side and the image surface side of the aperture stop S.

The above Condition (4) defines a range of the requirement related to the Abbe's numbers of the lenses in the second lens component L2, which is appropriate for a wide-angle lens system which is advantageous for adequately correcting the chromatic aberrations of the lens system.

When the parameter of the Condition (4) is less than the lower limit (=7), it is difficult to adequately correct the chromatic aberration on the object side of the aperture stop S. Also, when a junction lens is included in the second lens component L2 and the parameter of the Condition (4) is less than the lower limit, the radius of curvature of a junction surface of the junction lens will be too large, and it is difficult to produce the wide-angle lens system including such a junction lens. Also, in such a case, it is difficult to provide a reduction of the total thickness of the lens system, especially that on the object side of the aperture stop S.

Figure 2:
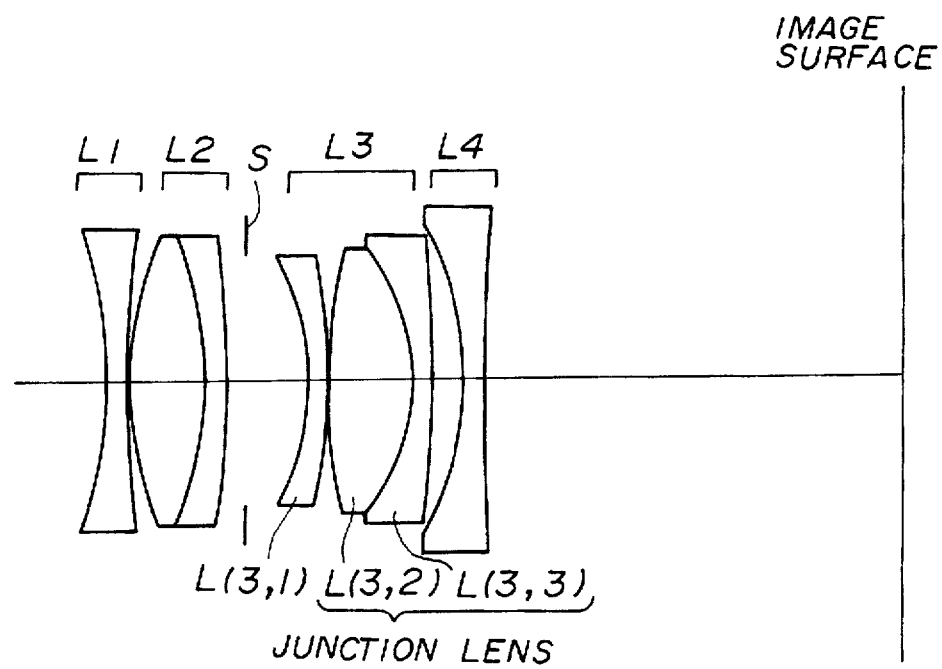
FIG. 2 is a diagram for explaining a construction of a compact wide-angle lens system in a second embodiment of the present invention.
Figure 3:
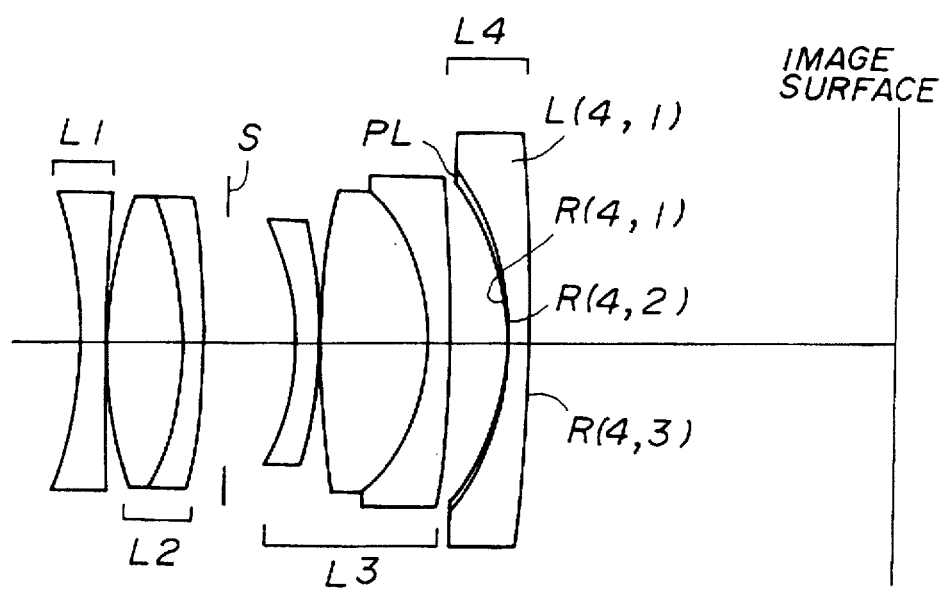
FIG. 3 is a diagram for explaining a variation of the compact wide-angle lens system in the second embodiment of the present invention.
Figure 4:
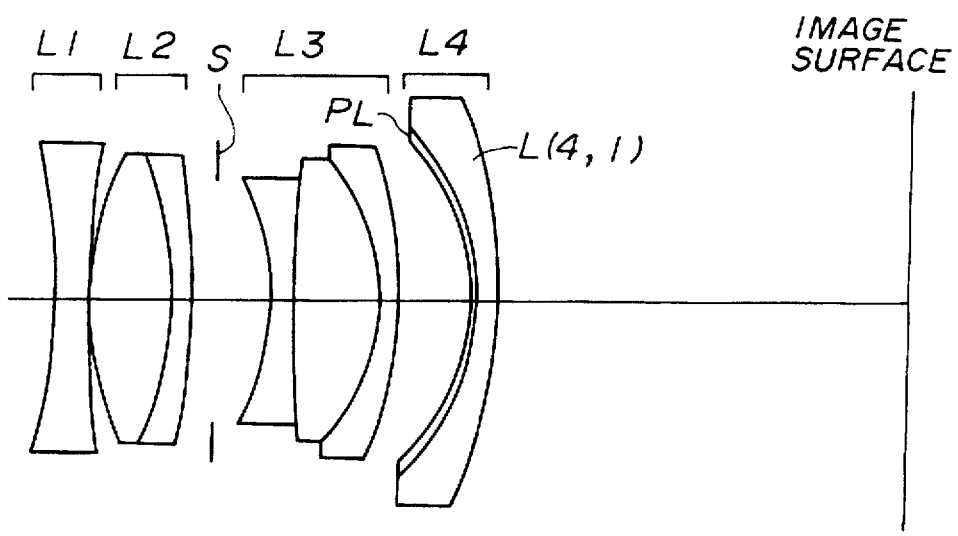
FIG. 4 is a diagram for explaining a variation of the compact wide-angle lens system in the first embodiment of the present invention.

FIG. 2 shows a compact wide-angle lens system in the second embodiment of the present invention. FIG. 3 shows a variation of the compact wide-angle lens system in the second embodiment, and FIG. 4 shows a variation of the compact wide-angle lens system in the first embodiment.

Further, in the wide-angle lens system in which the Conditions (1)–(4) are satisfied, the K-th one of refraction surfaces in the I-th one of the lens components L1 through L4 has a radius of curvature R(I, K) where K is an integer. The refraction surfaces in the wide-angle lens system are counted from the object side in the direction.

In the above-described lens system in which the Conditions (1)–(4) are satisfied, the fourth lens component L4 has a single negative lens L(4, 1), the negative lens L(4, 1) having a first refraction surface which is an aspherical surface on which a diverging characteristic increases toward the periphery of the aspherical surface. A radius of paraxial curvature R(4, 1) of the first refraction surface of the negative lens L(4, 1) in the fourth lens component L4 and a radius of curvature R(4, 2) of a second refraction surface of the negative lens L(4, 1) in the fourth lens component L4 satisfy the condition:

$$-6 < \{R(4, 1)+R(4, 2)\}/\{R(4, 1)-R(4, 2)\} < 2. \quad (5)$$

In the wide-angle lens system of the present embodiment, the first refraction surface of the negative lens L(4, 1) is formed as an aspherical surface on which a diverging characteristic increases toward the periphery of the aspherical surface. The aspherical surface of the negative lens L(4, 1) in the fourth lens component L4 is effective to adequately correct the curvature of field and the coma aberrations.

The above Condition (5) defines a range of the requirement related to the radius of paraxial curvature R(4, 1) of the first refraction surface of the negative lens L(4, 1) as the aspherical surface and the radius of curvature R(4, 2) of the second refraction surface of the negative lens L(4, 1), which is appropriate for a wide-angle lens system which is advantageous for adequately correcting the aberrations of the lens system.

When the parameter of the Condition (5) is less than the lower limit (=−6), the diverging characteristic of the fourth lens component L4 to make the rays of light from the peripheral portions of the negative lens L(4, 1) divergent is considerably increased, and it is difficult to adequately correct the coma aberrations of the lens system. Also, the radius of paraxial curvature R(4, 1) of the first refraction surface of the negative lens L(4, 1) as the aspherical surface is too large, and it is difficult to produce the wide-angle lens system including such a negative lens L(4, 1). In such a case, it is difficult to provide a reduction of the total thickness of the whole lens system.

When the parameter of the Condition (5) is larger than the upper limit (=2), the refraction angle of the rays of light from the peripheral portions of the negative lens L(4, 1) is too large, and it is difficult to correct the coma aberrations of the negative lens L(4, 1) in outward directions.

Alternatively, in the above-described lens system in which the Conditions (1)–(4) are satisfied, the fourth lens component L4 has a hybrid negative lens L(4, 1) which is shown in FIG. 3 or FIG. 4. The hybrid negative lens L(4, 1) in FIGS. 3 and 4 has a resin layer "PL" on a first refraction surface of the hybrid negative lens, the resin layer having an aspherical surface. In the fourth lens component L4, a radius of paraxial curvature R(4, 1) of the aspherical surface of the resin layer PL and a radius of curvature R(4, 3) of a third refraction surface of the hybrid negative lens L(4, 1) satisfy the condition:

$$-6 < \{R(4, 1)+R(4, 3)\}/\{R(4, 1)-R(4, 3)\} < 2. \quad (5A)$$

In the wide-angle lens system of the present embodiment, the first refraction surface (on the object side) of the resin layer PL of the fourth lens component L4 as the hybrid negative lens is never touched by the hand of a camera operator. Although the first refraction surface of the resin layer PL which is formed as the aspherical surface is easily flawed, it is possible for the present embodiment to effectively prevent the first refraction surface of the resin layer PL from being flawed.

Since the forming of the aspherical surface on a resin layer of the hybrid negative lens is less expensive than the forming of the aspherical surface on a glass lens, the wide-angle lens system of the present embodiment is advantageous to provide a reduction of the production cost.

In the wide-angle lens system of the present embodiment, it is preferred that the first refraction surface of the resin layer PL of the hybrid negative lens L(4, 1) is formed as an aspherical surface on which a diverging characteristic increase toward the periphery of the aspherical surface. The second refraction surface of the hybrid negative lens L(4, 1) on which the resin layer PL is formed has a radius of curvature R(4, 2) of a spherical surface.

The above Condition (5A) defines a range of the requirement related to the radius of paraxial curvature R(4, 1) of the aspherical surface of the resin layer PL and the radius of curvature R(4, 3) of the third refraction surface of the hybrid negative lens L(4, 1), which is appropriate for a wide-angle lens system which is advantageous for adequately correcting the aberrations of the lens system, similarly to the above Condition (5).

As shown in FIG. 3, the hybrid negative lens L(4, 1) has the radius of paraxial curvature R(4, 1) of the aspherical surface of the resin layer PL, a radius of curvature R(4, 2) of a second refraction surface of the hybrid negative lens, and the radius of curvature R(4, 3) of the third refraction surface of the hybrid negative lens.

Accordingly, in the above-described lens system in which the Conditions (1)–(4) are satisfied, the fourth lens component L4 includes either the single negative lens L(4, 1) (shown in FIGS. 1 and 2) having the first refraction surface formed as the aspherical surface or the hybrid negative lens L(4, 1) (shown in FIGS. 3 and 4) having the resin layer PL with the first refraction surface formed as the aspherical surface.

Further, in one of the above-described lens system in which the Conditions (1)–(4) and (5) are satisfied and the above-described lens system in which the Conditions (1)–(4) and (5A) are satisfied, the third lens component L3 has a concave lens L(3, 1), a double-convex lens L(3, 2) and a concave lens L(3, 3), the double-convex lens L(3, 2) and the concave lens L(3, 3) being joined to form a junction lens which is shown in FIGS. 2 and 3. The concave lens L(3, 1) has a first refraction surface with a large radius of curvature. An air lens between the concave lens L(3, 1) and the double-convex lens L(3, 2) is formed, the air lens having a fifth refracting power $\phi_A$, the whole lens system having a refracting power $\phi$. The fifth refracting power $\phi_A$ of the air lens and the refracting power $\phi$ of the whole lens system satisfy the condition:

$$0.2 < \phi_A/\phi < 1.8. \quad (6)$$

In the wide-angle lens system of the present embodiment, it is possible to utilize the air lens between the concave lens L(3, 1) and the double-convex lens L(3, 2) in the third lens component L3 to correct the aberrations of the lens system. The fifth refracting power of the air lens in the present embodiment performs an important role.

The above Condition (6) defines a range of the fifth refracting power of the air lens mentioned above, which is appropriate for a wide-angle lens system which is advantageous for adequately correcting the aberrations of the lens system.

When the parameter $\phi_A/\phi$ of the Condition (6) is less than the lower limit (=0.2), the role of the air lens to correct the distortion and the astigmatism of the lens system considerably decreases, and it is difficult to allow the balancing of the aberrations of the whole lens system being corrected.

When the parameter $\phi_A/\phi$ of the Condition (6) is larger than the upper limit (=0.5), a diverging characteristic of the air lens considerably increases, which will produce the coma aberrations of the lens system. Also, in such a case, the performance of the whole lens system is likely to be sharply influenced by assembly errors of the third lens component L3, and it is very difficult to provide a good performance of the wide-angle lens system.

Further, in one of the above-described lens system in which the Conditions (1)–(4) and (5) are satisfied and the above-described lens system in which the Conditions (1)–(4) and (5A) are satisfied, the third lens component L3 has a double-concave lens L(3, 1), a double-convex lens L(3, 2) and a concave meniscus lens L(3, 3), the three lenses being joined to form a junction lens which is shown in FIGS. 1 and 4. A refraction surface between the double-concave lens L(3, 1) and the double-convex lens L(3, 2) in the junction lens has a sixth refracting power $\phi_C$, and the whole lens system has a refracting power $\phi$. The sixth refracting power $\phi_C$ and the refracting power $\phi$ satisfy the condition:

$$0.15 < \phi_C/\phi < 0.5. \tag{7}$$

In the wide-angle lens system of the present embodiment, the third lens component L3 includes the three lenses L(3, 1), L(3, 2) and L(3, 3) which are joined to form a junction lens. As the performance of the third lens component L3 as the junction lens is hardly influenced by production errors and decentration, the wide-angle lens system of the present embodiment is advantageous for easy parts processing and system assembly.

As described above, in the present embodiment, the sixth refracting power $\phi_C$ of the refraction surface between the double-concave lens L(3, 1) and the double-convex lens L(3, 2) in the junction lens performs an important role.

The above Condition (7) defines a range of the sixth refracting power $\phi_C$ of the above-mentioned refraction surface in the junction lens, which is appropriate for a wide-angle lens system which is advantageous for easy parts processing and unit assembly.

When the parameter $\phi_C/\phi$ of the Condition (7) is less than the lower limit (=0.15), the role of the above-mentioned refraction surface to correct the distortion and the astigmatism of the lens system considerably decreases, and it is difficult to allow the balancing of the aberrations of the whole lens system being corrected.

When the parameter $\phi_C/\phi$ of the Condition (7) is larger than the upper limit (=0.5), the radius of curvature of the above-mentioned refraction surface is too large, and it is very difficult to process the double-convex lens L(3, 2).

In the wide-angle lens system of the present embodiment, the third lens component L3 as the junction lens has an increased number of junction surfaces and replaces boundaries between air and lens by the junction surfaces. The wide-angle lens system of the present embodiment is advantageous for adequately correcting the aberrations of the lens system.

Further, in one of the above-described lens system in which the Conditions (1)–(4) and (5) are satisfied and the above-described lens system in which the Conditions (1)–(4) and (5A) are satisfied, the double-concave lens L(1, 1) of the first lens component L1 has a first refraction surface and a second refraction surface, and a radius of curvature R(1, 1) of the first refraction surface and a radius of curvature R(1, 2) of the second refraction surface satisfy the condition:

$$-1 < \{R(1, 1)+R(1, 2)\}/\{R(1, 1)-R(1, 2)\} < 0. \tag{8}$$

In the wide-angle lens system of the present embodiment, the first lens component L1 comprises the double-concave lens and the fourth lens component L4 comprises the negative lens, and, by making the relationship between the first lens component L1 and the fourth lens component L4 with respect to the stop S asymmetrical, it is possible to provide a reduction of the total thickness of the wide-angle lens system.

The above Condition (8) defines the configuration of the double-concave lens of the first lens component L1 that is appropriate for the wide-angle lens system in which the relationship of the first and fourth lens components L1 and L4 is made asymmetrical.

When the parameter of the Condition (8) is less than the lower limit (=−1), the radius of curvature R(1, 1) of the first refraction surface (near the object) to the radius of curvature R(1, 2) of the second refraction surface (near the image surface) is too large, and the first refraction surface shows a considerable diverging characteristic. In such a case, it is difficult to adequately correct the spherical aberrations and the coma aberrations with other refraction surfaces.

When the parameter of the Condition (8) is larger than the upper limit (=0), the first refracting power $\phi 1$ of the first lens component L1 becomes inadequate. In such a case, it is difficult to adequately correct the curvature of field.

It is desirable that the wide-angle lens system in a modification of the present embodiment includes the first lens component L1 having the first refraction surface which is formed as an aspherical surface on which a diverging characteristic increases toward the periphery of the aspherical surface. The aspherical surface of the first lens component L1 in this modification makes it possible to adequately correct the curvature of field and the coma aberrations which may be produced on the fifth refraction surface of the second lens component L2.

Next, a description will be given of various examples of the above-described wide-angle lens systems of the present invention.

In the examples of the wide-angle lens systems, the following notation of several symbols is used. As shown in FIG. 1, a radius of curvature of the i-th one of surfaces of the lenses and the aperture stop is indicated by "Ri" where i is an integer and the surfaces are counted from the object side in the direction from the object side to the image surface side. In a case of an aspherical surface, "Ri" indicates a radius of paraxial curvature of the aspherical surface. A distance between the i-th surface and the (i+1)-th surface along the optical axis is indicated by "Di". A refractive index of the j-th one of the lenses in the example is indicated by "Nj" where j is an integer and the lenses are counted from the object side in the direction from the object side to the image surface side. An Abbe's number of the j-th one of the lenses in the example is indicated by "νj". A focal length of the whole lens system of the example is indicated by "f", an F-number of the lens system of the example is indicated by "FNO", and a half field angle of the example is indicated by "w".

Further, in the following examples, an aspherical surface in each example is determined by an external surface of a solid of revolution obtained by rotating a curve about the optical axis on its edge, the curve being defined in accordance with the equation:

$$X=(Y^2/R)/[1+\sqrt{1-(1+K)(Y/R)^2}]+AY^4+BY^6+CY^8+DY^{10}$$

where X is an x-coordinate of the curve in a direction parallel to the optical axis, Y is a y-coordinate of the curve in a direction perpendicular to the optical axis, R is a radius of paraxial curvature of the aspherical surface, K is a conical coefficient, and A, B, C, D, . . . are high-order coefficients.

In the following examples, values of the high-order coefficients A, B, C and D are indicated by using scientific notation. Scientific notation represents values as a number between 1 and 10 multiplied by 10 to some power. In this notation, the 10 is replaced by an uppercase E.

Example 1: f = 28.1, FNO = 2.86, w = 37.2

| i | Ri | Di | j | Nj | vj |
|---|---|---|---|---|---|
| 1 | −24.427 | 1.00 | 1 | 1.64769 | 33.8 |
| 2 | 48.935 | 0.08 | | | |
| 3 | 12.031 | 3.43 | 2 | 1.75700 | 47.7 |
| 4 | −14.840 | 0.90 | 3 | 1.68893 | 31.2 |
| 5 | −36.502 | 0.80 | | | |
| 6 | (stop) | 2.41 | | | |
| 7 | −10.144 | 0.80 | 4 | 1.48749 | 70.4 |
| 8 | 34.733 | 4.37 | 5 | 1.83500 | 43.0 |
| 9 | −8.514 | 0.80 | 6 | 1.74077 | 27.8 |
| 10 | −19.156 | 2.45 | | | |
| 11 | −9.270 | 1.20 | 7 | 1.60342 | 38.0 |
| 12 | −16.394 | | | | |

Aspherical Surfaces

No. 1 Surface

K = −0.0665, A = −2.7200E-5, B = −1.4150E-6,
C = 4.4660E-8, D = −6.1390E-10

No. 11 Surface

K = 0.5327, A = −8.3178E-5, B = 2.8840E-6,
C = −1.0011E-7, D = 1.0731E-9

Values of Parameters of Conditions

Condition (1): 1.44, Condition (2): 4.17, Condition (3): 1.8, Condition (4): 16.6, Condition (5): −3.6, Condition (7): 0.281, Condition (8): −0.334

Example 2: f = 28.8, FNO = 2.89, w = 36.5

| i | Ri | Di | j | Nj | vj |
|---|---|---|---|---|---|
| 1 | −26.372 | 0.90 | 1 | 1.68682 | 30.1 |
| 2 | 36.978 | 0.10 | | | |
| 3 | 12.359 | 3.39 | 2 | 1.82907 | 37.7 |
| 4 | −12.344 | 0.80 | 3 | 1.75273 | 26.79 |
| 5 | −44.069 | 0.80 | | | |
| 6 | (stop) | 2.15 | | | |
| 7 | −11.067 | 0.80 | 4 | 1.54331 | 47.8 |
| 8 | 30.398 | 4.28 | 5 | 1.83400 | 37.3 |
| 9 | −7.748 | 0.80 | 6 | 1.74512 | 27.1 |
| 10 | −19.873 | 1.89 | | | |
| 11 | −9.934 | 1.00 | 7 | 1.62765 | 34.7 |
| 12 | −12.185 | | | | |

Aspherical Surfaces

No. 1 Surface

K = 0.6157, A = −1.9810E-5, B = −1.4141E-6,
C = 4.4671E-8, D = −6.2712E-10

No. 11 Surface

K = 0.8971, A = −5.8969E-5, B = 3.4204E-6,
C = −1.2977E-7, D = 1.8051E-9

Values of Parameters of Conditions

Condition (1): 1.96, Condition (2): 5.48, Condition (3): 1.83, Condition (4): 10.9, Condition (5): −4.18, Condition (7): 0.38, Condition (8): −0.167

Example 3: f = 28.8, FNO = 2.88, w = 36.5

| i | Ri | Di | j | Nj | vj |
|---|---|---|---|---|---|
| 1 | −22.144 | 1.01 | 1 | 1.56019 | 44.0 |
| 2 | 71.703 | 0.10 | | | |
| 3 | 13.622 | 3.10 | 2 | 1.78195 | 42.4 |
| 4 | −13.524 | 1.20 | 3 | 1.84666 | 23.8 |
| 5 | −39.852 | 1.06 | | | |
| 6 | (stop) | 2.12 | | | |
| 7 | −11.682 | 0.80 | 4 | 1.48749 | 70.4 |
| 8 | 25.478 | 4.80 | 5 | 1.83400 | 37.3 |
| 9 | −7.529 | 0.80 | 6 | 1.74616 | 27.1 |
| 10 | −21.181 | 2.51 | | | |
| 11 | −10.086 | 1.00 | 7 | 1.65182 | 32.5 |
| 12 | −18.682 | | | | |

Aspherical Surface

No. 11 Surface

K = 0.7178, A = −6.3549E-5, B = 2.4889E-6,
C = −8.9139E-8, D = 1.0759E-9

Values of Parameters of Conditions

Figure 5:
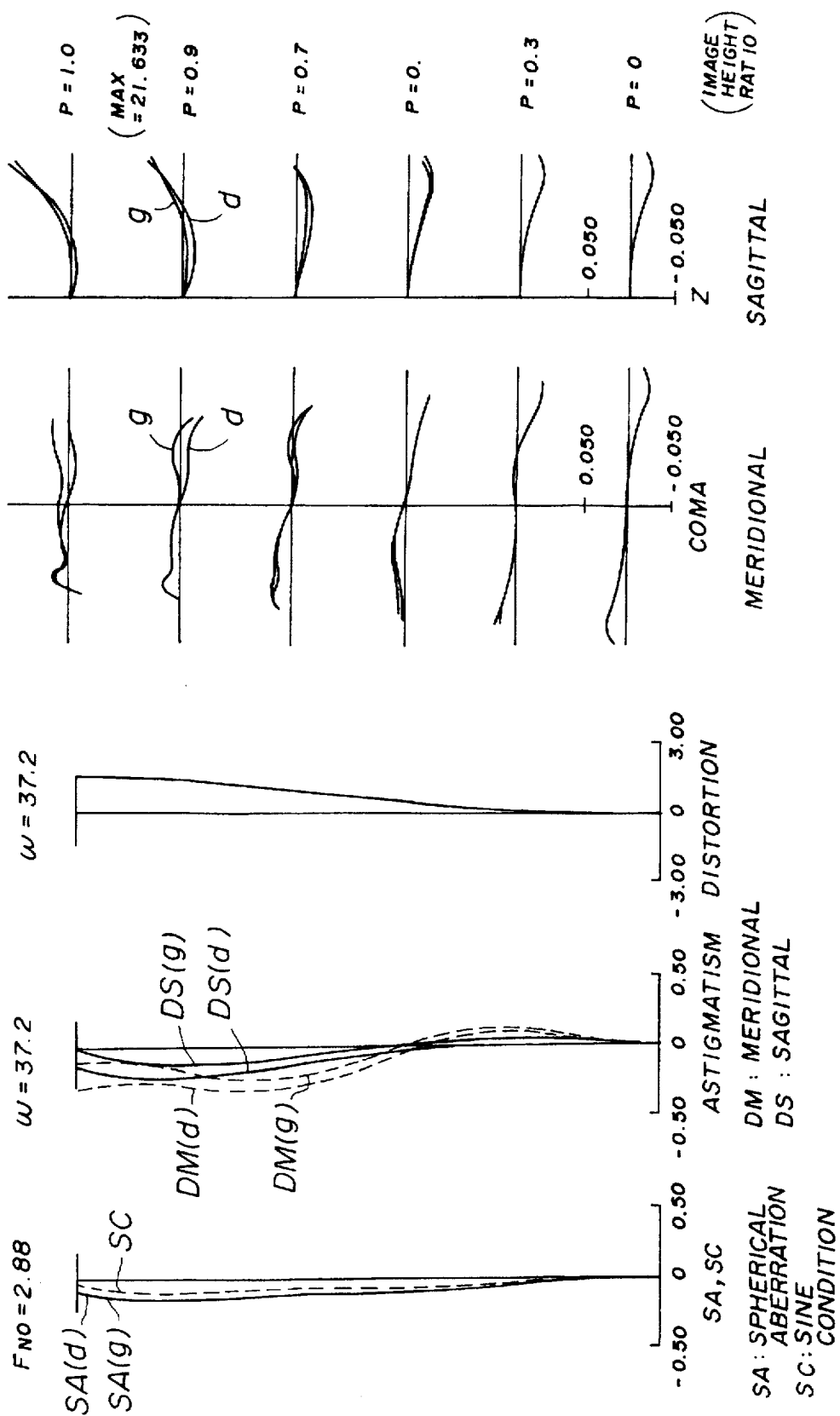
Figure 6:
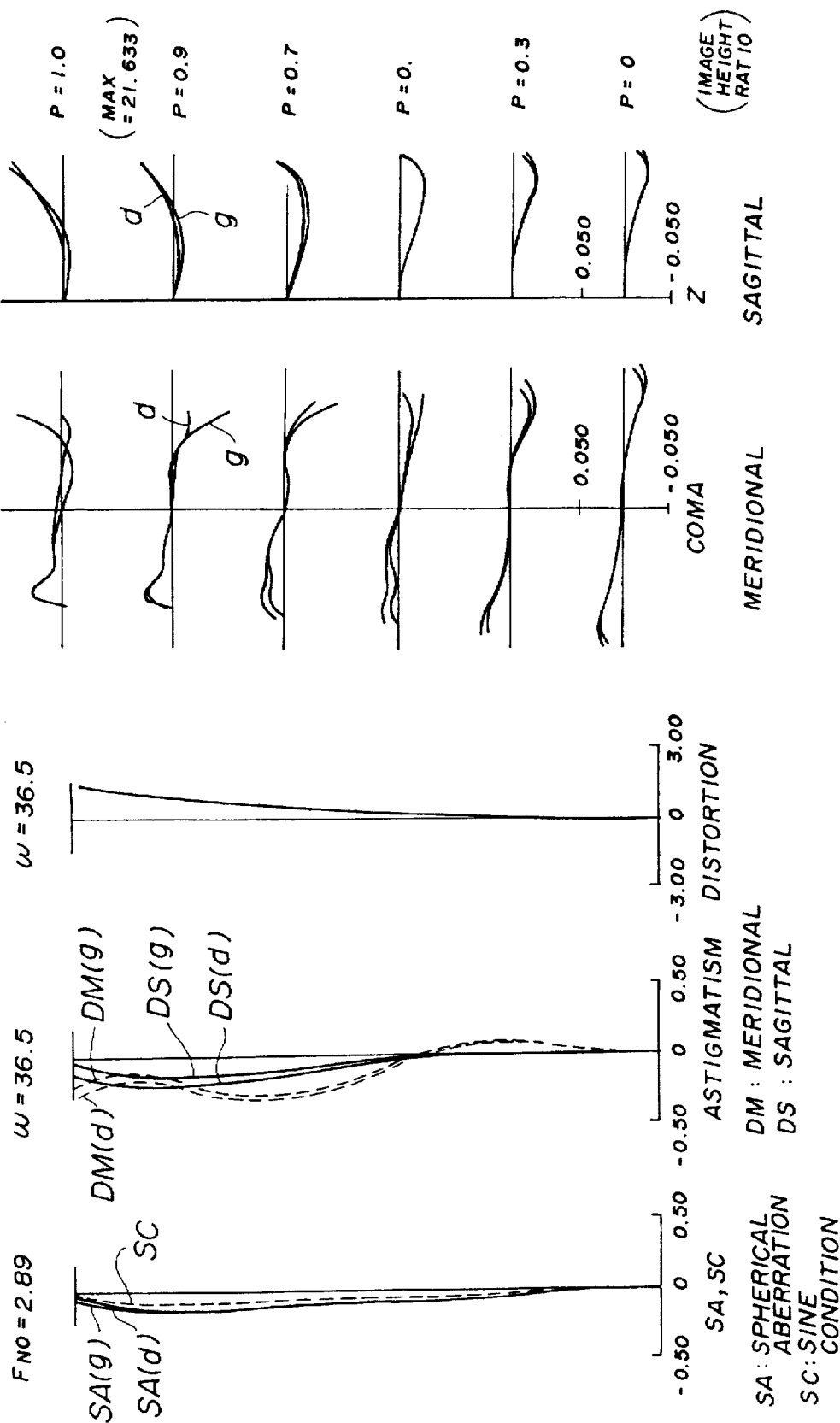

Condition (1): 1.17, Condition (2): 3.01, Condition (3): 1.81, Condition (4): 18.6, Condition (5): −3.35, Condition (7): 0.336, Condition (8): −0.528 Examples 1, 2 and 3 are examples of the wide-angle lens system in FIG. 1. Aberration curves of Examples 1, 2 and 3 are shown in FIGS. 5, 6 and 7, respectively.

Example 4: f = 28.8, FNO = 2.89, w = 36.5

| i | Ri | Di | j | Nj | vj |
|---|---|---|---|---|---|
| 1 | −16.781 | 0.90 | 1 | 1.64019 | 33.5 |
| 2 | 53.983 | 0.10 | | | |
| 3 | 13.909 | 3.18 | 2 | 1.83400 | 37.3 |
| 4 | −12.759 | 0.80 | 3 | 1.77121 | 26.1 |
| 5 | −42.160 | 0.80 | | | |
| 6 | (stop) | 2.59 | | | |
| 7 | −10.354 | 0.80 | 4 | 1.56606 | 42.9 |
| 8 | −27.026 | 0.10 | | | |
| 9 | 25.935 | 3.51 | 5 | 1.83400 | 37.3 |
| 10 | −7.498 | 0.80 | 6 | 1.71440 | 28.5 |
| 11 | −42.443 | 1.21 | | | |
| 12 | −17.345 | 1.00 | 7 | 1.54160 | 48.2 |
| 13 | 146.562 | | | | |

Aspherical Surface

No. 12 Surface

K = 3.4096, A = −2.4743E-4, B = −8.4278e-7,
C = −4.4788E-8, D = 5.6849E-10

Values of Parameters of Conditions

Condition (1): 1.43, Condition (2): 2.38, Condition (3): 1.83, Condition (4): 11.2, Condition (5): −0.788, Condition (6): 1.53, Condition (8): −0.524 Example 4 is an example of the wide-angle lens system in FIG. 2, and the aberration curves are shown in FIG. 8.

Example 5: f = 28.8, FNO = 2.89, w = 36.5

| i | Ri | Di | j | Nj | vj |
|---|---|---|---|---|---|
| 1 | −15.434 | 0.90 | 1 | 1.63792 | 33.7 |
| 2 | 78.922 | 0.10 | | | |
| 3 | 14.807 | 3.23 | 2 | 1.83400 | 37.3 |
| 4 | −12.739 | 0.80 | 3 | 1.82925 | 24.2 |
| 5 | −30.821 | 0.80 | | | |

-continued

| 6 | (stop) | 2.85 | | | |
|---|---|---|---|---|---|
| 7 | −10.122 | 0.80 | 4 | 1.53004 | 51.4 |
| 8 | −23.841 | 0.15 | | | |
| 9 | 27.664 | 4.04 | 5 | 1.83400 | 37.3 |
| 10 | 7.435 | 0.80 | 6 | 1.72913 | 27.8 |
| 11 | −59.794 | 1.63 | | | |
| 12 | −15.652 | 1.00 | 7 | 1.51173 | 57.8 |
| 13 | 146.562 | | | | |

Aspherical Surface

No. 12 Surface $K = 3.0486, A = -2.1114E-4, B = -4.8847E-7,$
$C = -4.1489E-8, D = 5.6600E-10$ Values of Parameters of Conditions Condition (1): 1.54, Condition (2): 2.81, Condition (3): 1.83, Condition (4): 13.1, Condition (5): −1.03, Condition (6): 1.51, Condition (8): −0.673 Example 5 is an example of the wide-angle lens system in FIG. 2, and the aberration curves are shown in FIG. 9.

Example 6: f = 28.2, FNO = 2.88, w = 37.2

| i | Ri | Di | j | Nj | vj |
|---|---|---|---|---|---|
| 1 | −14.593 | 1.00 | 1 | 1.63665 | 33.8 |
| 2 | 215.917 | 0.05 | | | |
| 3 | 15.427 | 3.14 | 2 | 1.83400 | 37.3 |
| 4 | −12.377 | 0.80 | 3 | 1.83812 | 24.0 |
| 5 | −29.227 | 1.00 | | | |
| 6 | (stop) | 2.84 | | | |
| 7 | −9.704 | 0.90 | 4 | 1.55978 | 44.1 |
| 8 | −19.329 | 0.05 | | | |
| 9 | 30.900 | 4.45 | 5 | 1.83400 | 37.3 |
| 10 | −7.417 | 0.80 | 6 | 1.72008 | 28.2 |
| 11 | −66.298 | 2.33 | | | |
| 12 | −12.454 | 0.10 | 7 | 1.51940 | 52.1 |
| 13 | −10.710 | 0.90 | 8 | 1.51680 | 64.2 |
| 14 | −66.219 | | | | |

Aspherical Surface

No. 12 Surface $K = 1.6126, A = -1.7912E-4, B = -5.1823E-7,$
$C = -3.9278E-8, D = 5.1059E-10$ Values of Parameters of Conditions Condition (1): 1.71, Condition (2): 2.91, Condition (3): 1.83, Condition (4): 13.3, Condition (5A): −1.46, Condition (6): 1.58, Condition (8): −0.873

Example 7: f = 28.2, FNO = 2.87, w = 37.1

| i | Ri | Di | j | Nj | vj |
|---|---|---|---|---|---|
| 1 | −22.251 | 1.30 | 1 | 1.54814 | 45.8 |
| 2 | 37.536 | 0.05 | | | |
| 3 | 11.759 | 3.39 | 2 | 1.72593 | 51.1 |
| 4 | −13.236 | 0.80 | 3 | 1.75054 | 26.9 |
| 5 | −29.401 | 1.00 | | | |
| 6 | (stop) | 2.30 | | | |
| 7 | −9.410 | 0.90 | 4 | 1.48749 | 70.4 |
| 8 | 101.510 | 0.05 | | | |
| 9 | 56.392 | 3.50 | 5 | 1.83460 | 37.3 |
| 10 | −7.615 | 0.80 | 6 | 1.79341 | 25.3 |
| 11 | −15.88.7 | 3.10 | | | |
| 12 | −9.329 | 0.10 | 7 | 1.51940 | 52.1 |
| 13 | −8.968 | 0.90 | 8 | 1.61293 | 37.0 |
| 14 | −18.232 | | | | |

-continued

Aspherical Surfaces

No. 1 Surface $K = 0.8747, A = -3.3198E-5, B = -6.4326E-7,$
$C = 2.2068E-8, D = -3.1662E-10$ No. 12 Surface $K = 0.5280, A = -9.3420E-5, B = 1.4922E-6,$
$C = -7.0629E-8, D = 7.4218E-10$ Example 7: f = 28.2, FNO = 2.87, w = 37.1

Values of Parameters of Conditions

Condition (1): 1.21, Condition (2): 6.35, Condition (3): 1.78, Condition (4): 25.8, Condition (5A): −3.1, Condition (6): 0.282, Condition (8): −0.256. Example 6 and Example 7 are an example of the wide-angle lens system in FIG. 3 and an example of the wide-angle lens system in FIG. 4, respectively. Aberration curves of Example 6 and aberration curves of Example 7 are shown in FIG. 10 and in FIG. 11, respectively.

In FIGS. 5 through 11, the aberration curves of the above Examples 1 through 7 are shown. As is apparent from FIGS. 5 through 11, the aberrations of the lens system of the wide-angle lens system in each of the above-described examples are adequately corrected.

It has been found that, in the above Examples 1 through 7, the ratio of the total thickness (D) of the lens system to the focal length (f) of the lens system is in the range from 0.549 to 0.651. Since the wide-angle lens system in each of the above-described embodiments has a reduced total thickness, it can be suitably applied to a compact camera having a retracting mechanism which sets the lens system in the retracted condition. Therefore, it is verified that the wide-angle lens system in each of the above-described embodiments has a reduced total thickness and provides a good performance to adequately correct the aberrations of the lens system.

Further, the present invention is not limited to the above-described embodiments, and variations and modifications may be made without departing from the scope of the present invention.

What is claimed is:

1. A wide-angle lens system comprising:
   a first lens component, a second lens component, a third lens component and a fourth lens component which are arranged in this order in a direction from an object side to an image surface side along an optical axis; and
   a stop provided between the second lens component and the third lens component,
   the first lens component comprising a double-concave lens, said first lens component having a first refracting power φ1 which is negative,
   the second lens component comprising a positive lens and a negative lens which are arranged in this order in the direction, said second lens component having a second refracting power φ2 which is positive,
   the third lens component comprising a negative lens, a positive lens and a negative lens which are arranged in this order in the direction, said third lens component having a third refracting power φ3 which is positive,
   the fourth lens component comprising a negative lens, said fourth lens component having a fourth refracting power φ4 which is negative,
   wherein said first refracting power, said second refracting power, said third refracting power, and said fourth refracting power satisfy the conditions:

$$0.7 < \phi 1/\phi 4 < 2.5 \tag{1}$$

$$1.8 < \phi 2/\phi 3 < 7.0. \tag{2}$$

2. The wide-angle lens system according to claim 1, wherein I and J are integers and the J-th one of lenses in the I-th one of said first, said second, said third and said fourth lens components is represented by L(I, J), said J-th lens having a refractive index N{L(I, J)} and an Abbe's number ν{L(I, J)}, wherein a refractive index N{L(2, 1)} of the lens L(2, 1) in the second lens component and a refractive index N{L(3, 2)} of the lens L(3, 2) in the third lens component satisfy the condition:

$$1.7 < \{N\{L(2, 1)\} + N\{L(3, 2)\}\}/2, \tag{3}$$

and an Abbe's number ν{L(2, 1)} of the lens L(2, 1) and an Abbe's number ν{L(2, 2)} of the lens L(2, 2) in the second lens component satisfy the condition:

$$7 < \nu\{L(2, 1)\} - \nu\{L(2, 2)\}. \tag{4}$$

3. The wide-angle lens system according to claim 2, wherein K is an integer and the K-th one of refraction surfaces in the I-th one of said first, said second, said third and said fourth lens components has a radius of curvature R(I, K), wherein said fourth lens component has a single negative lens, said negative lens having a first refraction surface which is an aspherical surface on which a diverging characteristic increases toward the periphery of the aspherical surface, wherein a radius of curvature R(4, 1) of the first refraction surface of said negative lens in the fourth lens component and a radius of curvature R(4, 2) of a second refraction surface of said negative lens in the fourth lens component satisfy the condition:

$$-6 < \{R(4, 1) + R(4, 2)\}/\{R(4, 1) - R(4, 2)\} < 2. \tag{5}$$

4. The wide-angle lens system according to claim 2, wherein K is an integer and the K-th one of refraction surfaces in the I-th one of said first, said second, said third and said fourth lens components has a radius of curvature R(I, K), wherein said fourth lens component has a hybrid negative lens, said hybrid negative lens having a resin layer on a first refraction surface of said hybrid negative lens, said resin layer having an aspherical surface, wherein a radius of paraxial curvature R(4, 1) of said aspherical surface of said resin layer and a radius of curvature R(4, 3) of a third refraction surface of the hybrid negative lens satisfy the condition:

$$-6 < \{R(4, 1) + R(4, 3)\}/\{R(4, 1) - R(4, 3)\} < 2. \tag{5A}$$

5. The wide-angle lens system according to claim 3, wherein said third lens component has a concave lens L(3, 1), a double-convex lens L(3, 2) and a concave lens L(3, 3), said double-convex lens L(3, 2) and said concave lens L(3, 3) being joined to form a junction lens, and an air lens between said lens L(3, 1) and said lens L(3, 2) being formed, the air lens having a fifth refracting power $\phi_A$, the whole lens system having a refracting power $\phi$, wherein said fifth refracting power and said refracting power satisfy the condition:

$$0.2 < \phi_A/\phi < 1.8. \tag{6}$$

6. The wide-angle lens system according to claim 3, wherein said third lens component has a double-concave lens L(3, 1), a double-convex lens L(3, 2) and a concave meniscus lens L(3, 3) which are joined to form a junction lens, a refraction surface between said lens L(3, 1) and said lens L(3, 2) in said junction lens having a sixth refracting power $\phi_C$, the whole lens system having a refracting power $\phi$, wherein said sixth refracting power and said refracting power satisfy the condition:

$$0.15 < \phi_C/\phi < 0.5. \tag{7}$$

7. The wide-angle lens system according to claim 3, wherein said double-concave lens of the first lens component has a first refraction surface and a second refraction surface, and a radius of curvature R(1, 1) of the first refraction surface and a radius of curvature R(1, 2) of the second refraction surface satisfy the condition:

$$-1 < \{R(1, 1) + R(1, 2)\}/\{R(1, 1) - R(1, 2)\} < 0. \tag{8}$$

8. The wide-angle lens system according to claim 4, wherein said third lens component has a concave lens L(3, 1), a double-convex lens L(3, 2) and a concave lens L(3, 3), said double-convex lens L(3, 2) and said concave lens L(3, 3) being joined to form a junction lens, and an air lens between said lens L(3, 1) and said lens L(3, 2) being formed, the air lens having a fifth refracting power $\phi_A$, the whole lens system having a refracting power $\phi$, wherein said fifth refracting power and said refracting power satisfy the condition:

$$0.2 < \phi_A/\phi < 1.8. \tag{6}$$

9. The wide-angle lens system according to claim 4, wherein said third lens component has a double-concave lens L(3, 1), a double-convex lens L(3, 2) and a concave meniscus lens L(3, 3) which are joined to form a junction lens, a refraction surface between said lens L(3, 1) and said lens L(3, 2) in said junction lens having a sixth refracting power $\phi_C$, the whole lens system having a refracting power $\phi$, wherein said sixth refracting power and said refracting power satisfy the condition:

$$0.15 < \phi_C/\phi < 0.5. \tag{7}$$

10. The wide-angle lens system according to claim 4, wherein said double-concave lens of the first lens component has a first refraction surface and a second refraction surface, and a radius of curvature R(1, 1) of the first refraction surface and a radius of curvature R(1, 2) of the second refraction surface satisfy the condition:

$$-1 < \{R(1, 1) + R(1, 2)\}/\{R(1, 1) - R(1, 2)\} < 0. \tag{8}$$

11. A wide-angle lens system comprising:
    a first lens element which is a double-concave lens having a first refracting power $\phi 1$ which is negative;
    a second lens element which is a positive lens;
    a third lens element which is a negative lens, said second and said third lens elements having a second refracting power $\phi 2$ which is positive;
    a fourth lens element which is a negative lens;
    a fifth lens element which is a positive lens;
    a sixth lens element which is a negative lens, said fourth, said fifth and said sixth lens elements having a third refracting power $\phi 3$ which is positive;

a seventh lens element which is a negative lens having a fourth refracting power $\phi 4$ which is negative; and a stop provided between said third lens element and said fourth lens element, said first, said second, said third, said fourth, said fifth, said sixth and said seventh lens elements being arranged in this order in a direction from an object side to an image surface side along an optical axis, wherein said first refracting power, said second refracting power, said third refracting power, and said fourth refracting power satisfy the conditions:

$$0.7 < \phi 1/\phi 4 < 2.5 \qquad (1)$$

$$1.8 < \phi 2/\phi 3 < 7.0. \qquad (2)$$

12. The wide-angle lens system according to claim 11, wherein a refractive index $N\{L(2, 1)\}$ of said second lens element and a refractive index $N\{L(3, 2)\}$ of said fifth lens element satisfy the condition:

$$1.7 < [N\{L(2, 1)\} + N\{L(3, 2)\}]/2, \qquad (3)$$

and an Abbe's number $v\{L(2, 1)\}$ of said second lens element and an Abbe's number $v\{L(2, 2)\}$ of said third lens element satisfy the condition:

$$7 < v\{L(2, 1)\} - v\{L(2, 2)\}. \qquad (4)$$

13. The wide-angle lens system according to claim 12, wherein said seventh lens element has a first refraction surface and a second refraction surface, said first refraction surface being an aspherical surface on which a diverging characteristic increases toward the periphery of the aspherical surface, wherein a radius of curvature $R(4, 1)$ of the first refraction surface of said seventh lens element and a radius of curvature $R(4, 2)$ of the second refraction surface of said seventh lens element satisfy the condition:

$$-6 < \{R(4, 1) + R(4, 2)\}/\{R(4, 1) - R(4, 2)\} < 2. \qquad (5)$$

14. The wide-angle lens system according to claim 12, wherein said seventh lens element is a hybrid negative lens, said hybrid negative lens having a resin layer on a first refraction surface of said hybrid negative lens, said resin layer having an aspherical surface, wherein a radius of paraxial curvature $R(4, 1)$ of said aspherical surface of said resin layer and a radius of curvature $R(4, 3)$ of a third refraction surface of the hybrid negative lens satisfy the condition:

$$-6 < \{R(4, 1) + R(4, 3)\}/\{R(4, 1) - R(4, 3)\} < 2. \qquad (5A)$$

15. The wide-angle lens system according to claim 13, wherein said fourth lens element is a concave lens $L(3, 1)$, said fifth lens element is a double-convex lens $L(3, 2)$, and said sixth lens element is a concave lens $L(3, 3)$, said double-convex lens $L(3, 2)$ and said concave lens $L(3, 3)$ being joined to form a junction lens, and an air lens between said lens $L(3, 1)$ and said lens $L(3, 2)$ being formed, the air lens having a fifth refracting power $\phi_A$, the whole lens system having a refracting power $\phi$, wherein said fifth refracting power and said refracting power satisfy the condition:

$$0.2 < \phi_A/\phi < 1.8. \qquad (6)$$

16. The wide-angle lens system according to claim 13, wherein said fourth lens element is a double-concave lens $L(3, 1)$, said fifth lens element is a double-convex lens $L(3, 2)$, and said sixth lens element is a concave meniscus lens $L(3, 3)$, said lens $L(3, 1)$, said lens $L(3, 2)$ and said lens $L(3, 3)$ being joined to form a junction lens, a refraction surface between said lens $L(3, 1)$ and said lens $L(3, 2)$ in said junction lens having a sixth refracting power $\phi_C$, the whole lens system having a refracting power $\phi$, wherein said sixth refracting power and said refracting power satisfy the condition:

$$0.15 < \phi_C/\phi < 0.5. \qquad (7)$$

17. The wide-angle lens system according to claim 13, wherein said first lens element has a first refraction surface and a second refraction surface, and a radius of curvature $R(1, 1)$ of the first refraction surface and a radius of curvature $R(1, 2)$ of the second refraction surface satisfy the condition:

$$-1 < \{R(1, 1) + R(1, 2)\}/\{R(1, 1) - R(1, 2)\} < 0. \qquad (8)$$

18. The wide-angle lens system according to claim 14, wherein said fourth lens element is a concave lens $L(3, 1)$, said fifth lens element is a double-convex lens $L(3, 2)$, and said sixth lens element is a concave lens $L(3, 3)$, said double-convex lens $L(3, 2)$ and said concave lens $L(3, 3)$ being joined to form a junction lens, and an air lens between said lens $L(3, 1)$ and said lens $L(3, 2)$ being formed, the air lens having a fifth refracting power $\phi_A$, the whole lens system having a refracting power $\phi$, wherein said fifth refracting power and said refracting power satisfy the condition:

$$0.2 < \phi_A/\phi < 1.8. \qquad (6)$$

19. The wide-angle lens system according to claim 14, wherein said fourth lens element is a double-concave lens $L(3, 1)$, said fifth lens element is a double-convex lens $L(3, 2)$, and said sixth lens element is a concave meniscus lens $L(3, 3)$, said lens $L(3, 1)$, said lens $L(3, 2)$ and said lens $L(3, 3)$ being joined to form a junction lens, a refraction surface between said lens $L(3, 1)$ and said lens $L(3, 2)$ in said junction lens having a sixth refracting power $\phi_C$, the whole lens system having a refracting power $\phi$, wherein said sixth refracting power and said refracting power satisfy the condition:

$$0.15 < \phi_C/\phi < 0.5. \qquad (7)$$

20. The wide-angle lens system according to claim 14, wherein said first lens element has a first refraction surface and a second refraction surface, and a radius of curvature $R(1, 1)$ of the first refraction surface and a radius of curvature $R(1, 2)$ of the second refraction surface satisfy the condition:

$$-1 < \{R(1, 1) + R(1, 2)\}/\{R(1, 1) - R(1, 2)\} < 0. \qquad (8)$$

21. A wide-angle lens system comprising:

a first lens component, a second lens component, a third lens component and a fourth lens component which are arranged in this order in a direction from an object side to an image surface side along an optical axis; and a stop provided between the second lens component and the third lens component, the first lens component comprising a double-concave lens, said first lens component having a first refracting power $\phi 1$ which is negative, the second lens component comprising a positive lens and a negative lens which are arranged in this order in the direction, said second lens component having a second refracting power $\phi2$ which is positive, the third lens component comprising a negative lens, a positive lens and a negative lens which are arranged in this order in the direction, said third lens component having a third refracting power $\phi3$ which is positive, the fourth lens component comprising a negative lens, said fourth lens component having a fourth refracting power $\phi4$ which is negative, wherein I and J are integers and the J-th one of lenses in the I-th one of said first, said second, said third and said fourth lens components has a refractive index which is represented by N(I, J), wherein a refractive index N(3, 2) of the positive lens in said third lens component, a refrective index N(3, 1) of the negative lens in said third lens component and a refractive index N(3, 3) of the negative lens in said third lens component satisfy the condition:

$$0.1 < N(3, 2) - \{N(3, 1) + N(3, 3)\}/2. \quad (1A)$$

22. The wide-angle lens system according to claim 21, wherein said first refracting power, said second refracting power, said third refracting power and said fourth refracting power satisfy the conditions:

$$0.7 < \phi1/\phi4 < 2.5 \quad (1)$$

$$1.8 < \phi2/\phi3 < 7.0. \quad (2)$$

23. The wide-angle lens system according to claim 21, wherein the refractive index N(3, 2) of the positive lens is greater than the average of the refrective index N(3, 1) of the negative lens and the refractive index N(3, 3) of the negative lens in said third lens component.

* * * * *